United States Patent Office 3,322,177
Patented May 30, 1967

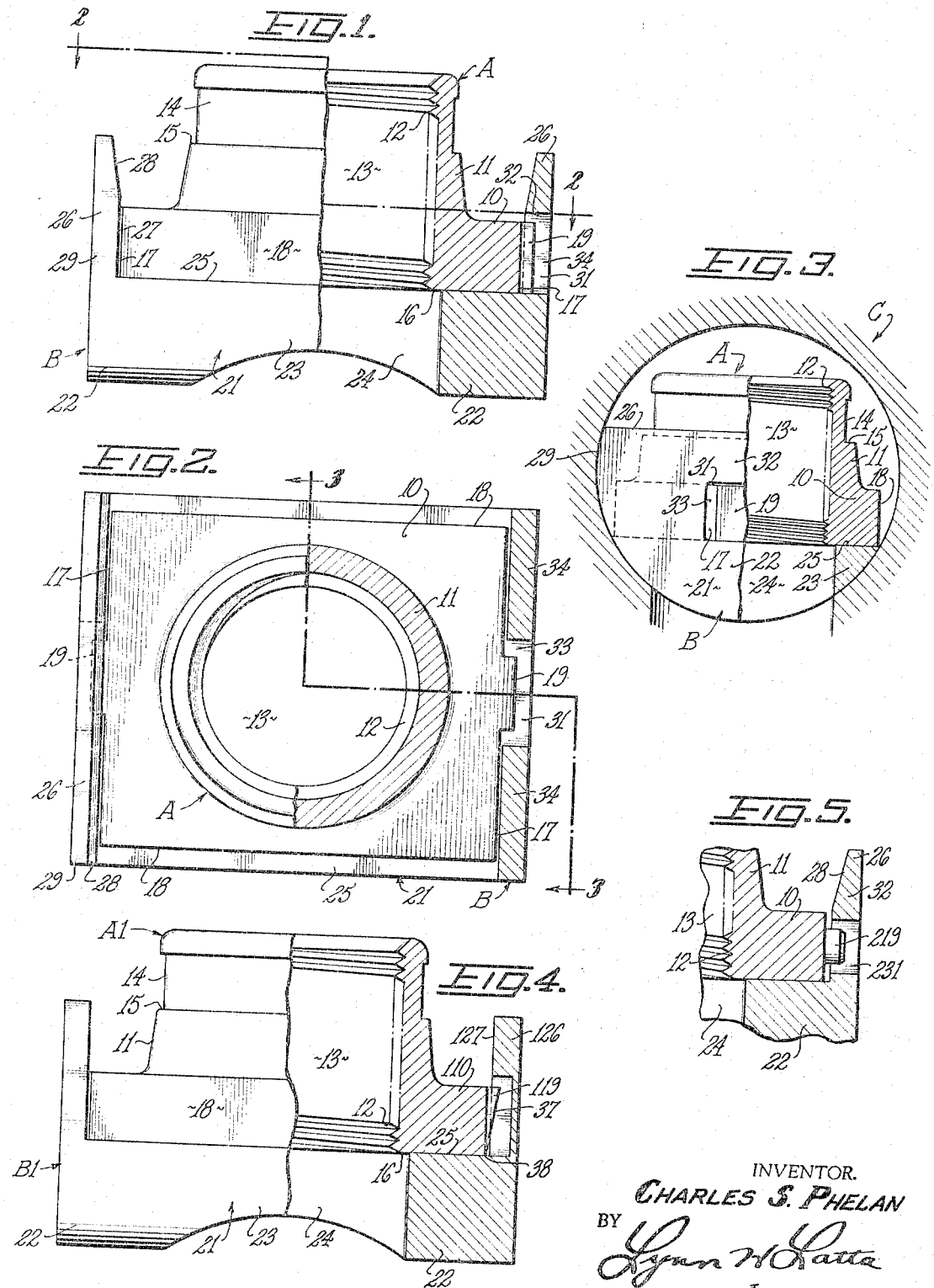

3,322,177
BARREL NUT WITH LATCHING RETAINER MEANS
Charles S. Phelan, Tustin, Calif., assignor, by mesne assignments, to Shur-Lok Corporation, Santa Ana, Calif., a corporation of California
Filed Aug. 9, 1965, Ser. No. 478,121
7 Claims. (Cl. 151—41.76)

This invention relates to barrel nuts of the type disclosed in U.S. Patent No. 3,081,809 issued Mar. 19, 1963, to Frederick W. Rohe and has as its general object to provide an improved assembly of nut and segmental cylindrical cradle embodying a snap-in latching type of retaining connection between the nut base and the cradle.

Toward the attainment of this general object the invention provides a barrel nut:

(1) Comprising a nut having a rectangular flanged base and a cradle having a nut seat for supporting said base and a pair of oppositely disposed upstanding retainer ears between which a pair of opposite parallel sides of the nut base and retained with clearance for limited slidable shifting of the nut base on the cradle seat while being restrained against rotation; and wherein cooperating latching means are provided on the nut base and the retainer ears for latching the nut to the cradle while permitting the limited slidable shifting of the base on the seat both parallel to and transversely of the cradle axis;

(2) Wherein the latching connection provides the means for limiting the transverse shifting movement of the nut base on the seat, and also provides a means for preventing removal of the nut bodily away from the cradle;

(3) Wherein the nut can be installed in the cradle rapidly and simply by extreting pressure along the nut axis to force the nut base between the retainer ears of the cradle until the base is latched to the retainer ears;

(4) Wherein the retainer ears are resilient so as to spread apart to receive the nut base between them and to spring back together to effect latching of the base when it is seated against the cradle seat.

Other objects and advantages will become apparent in the ensuing specification and appended drawing in which:

FIG. 1 is a view, partially in side elevation and partially in axial section, of a barrel nut embodying by invention;

FIG. 2 is a view of the same partially in plan and partially in section as indicated by the line 2—2 of FIG. 1;

FIG. 3 is a view of the same partially in end elevation and partially in cross section as indicated by the line 3—3 of FIG. 2;

FIG. 4 is a view of a modified form of the invention, partially in side elevation and partially in axial section;

FIG. 4 is a view, partially in side elevation and partially in section, of a modified form of the invention; and FIG. 5 is a fragmentary sectional view of another form of the invention.

Referring now to the drawings in detail, and in particular to FIGS. 1-3, I have shown therein, as an example of one form in which the invention may be embodied, a barrel nut comprising, in general, a nut A mounted, with freedom for limited self-aligning movements transversely to its bolt axis, in a cradle B which in turn is adapted to be mounted for rotational alignment in a bore of a casting or other workpiece C (FIG. 3).

Nut A may conventionally embody a rectangular mounting base 10, a crown collar 11 rising from the base 10, and a female thread 12 defining a threaded bore 13 for reception of a bolt, the crown collar 11 having a shallow annular external recess 14 defining a shoulder 15 as a seat for a retainer spring where is is desired to utilize light spring-loading of the nut upon its seat.

The base 10 has a flat underface 16 for seating against the cradle B, a pair of squared end faces 17 for antirotational coupling to the cradle B, and a pair of side faces 18 which preferably are straight and parallel and spaced sufficiently closely to remain within the envelope of the cradle B.

A pair of latch lugs 19, integral with the respective ends of nut base 18, project from the central areas thereof. As best shown in FIG. 1, the lugs 19 may extend the full depth of the base 10.

Cradle B comprises a segmental cylindrical body portion 21 including solid end portions 22 and lateral bridge portions 23 surrounding a central bolt opening 24 of slightly larger diameter than the thread-base diameter of threaded bore 13 so that the bolt may be freely passed through the opening 24 and be threaded into the female thread 12. The body portion 21 of the cradle has a radial depth equivalent to approximately ½ the radius of generation of the cylindrical periphery thereof (and of the bore in workpiece C in which the barrel nut is installed), the depth as shown in the drawings being slightly more than half the radius. The upper face of cradle body 21 is flat and disposed chordally with reference to the cylindrical periphery, and provides a nut seat 25 against which the nut base 10 is seated. The cradle further includes a pair of retainer ears 26, integral with the body 21 and projecting upwardly from the seat 25 at respective ends thereof. The ears 26 have flat, parallel inward retainer faces 27, normal to the seat 25 and extending to a height approximately equal to the depth of nut base 10, and a pair of beveled faces 28 extending from the retainer faces 27 in outwardly flaring relation to the upper margins of the retainer ears, which upper margins are parallel to the seat 25. Thus, the ears 26, in end elevation as viewed in FIG. 3, are approximately rectangular, but with their side margins 29 being formed as cylindrical continuations of the cylindrical periphery of the body 21.

The inward retainer faces 27 of lips 26 are spaced apart a distance sufficiently greater than the length of nut base 10 so as to provide clearance between the retainer faces 27 and the end faces 17 of the nut base, for some endwise float of the nut between the retainer lips 26, thus to accommodate self aligning movements of the nut when a bolt is inserted into it through the cradle opening. The lateral faces 18 of the nut base 10 are spaced apart a distance somewhat less than the transverse dimension of the seat 25, so that the lateral extremities of seat 25 will project slightly beyond the sides of the nut base 10 as shown in FIG. 3, thus avoiding any possibility of contact between the edges of the nut base 10 and the mounting bore in body C.

In the central areas of retainer ears 26 are respective latch recess 31 which can be in the form of through openings as shown. Openings 31 are positioned to receive the latch lugs 19 of the nut A, with only slight clearance between the upper extremities of the lugs 19 and the overhanging bridge portions 32 of ears 26 defining the top sides of the recesses 31. Thus, the nut is secured against displacement away from the seat 25 by engagement of the lugs against the bridge portions 32. The openings 31 are preferably substantially rectangular to conform to the rectangular end configuration of the lugs 19, but with substantially greater width, so as to provide substantial clearance spaces 33 between the sides of the lugs 19 and the sides of the openings 31. This provides for limited transverse shifting movement of the nut base 10 upon the seat 25, transversely of the longitudinal axis of the cradle B.

The ears 26 overhang the lugs 19 at 32 a relatively short distance, though adequate to securely retain the nut against escape from the cradle. The ears 26 are sufficiently flexible to spread apart to the extent of this overhang, so that the end faces of lugs 19 may be forced between the inward faces 27 of the bridge portions 32 of ears 26 just above the openings 31. Thus it becomes possible to force the nut base 10 downwardly between the ears 26, with a wedging action between the beveled faces 28, which, in response to heavy pressure against the nut, will cause the ears 26 to be wedged apart so as to accommodate the passage of the lugs 19 downwardly between the ears until they clear the bridge portions 32 and enter the recesses 31, permitting the ears 26 to spring back into overhanging, latched relation to the lugs 19.

The bridge portions 32 of ears 26 are joined integrally to the cradle body 21 by laterally spaced arms 34 which define the sides of openings 31. Arms 34 provide the ears 26 with resiliency for flexing to spread the bridge portions 32 apart as the lugs 19 are wedged between them. Ears 26 are relatively thin, flexible and elastic in order to provide such resiliency.

The retainer cradle B can be fabricated from stainless steel heat-treated to 140,000 p.s.i. tensile strength. The nut A can be fabricated from the same material cold-forged and heat treated through approximately 180,000 p.s.i.

The barrel nut is adapted to be installed in a cylindrical bore 35 in a workpiece C, of substantially the same diameter as the cylindrical wall of cradle B but slightly larger, just sufficient to provide clearance for self-aligning rotation of the cradle within the bore 35 during installation of a bolt through a bore 36 in the workpiece C, through the bore 24 of the cradle and into the nut.

FIG. 4 illustrates a modified form of the invention wherein the retainer ears 126 of the cradle B1 have inward retainer faces 127 extending the full height of the ears and without any flare between the ears; and wherein the lugs 119 of nut A1 are of wedge form, having wedging faces 37 converging toward the bottom face 16 of the nut base 119 of nut A1 are of wedge form, having wedging faces which are spaced apart a distance slightly less than the spacing between the retainer faces 127 of the ears 126, whereby the nut base can be readily inserted between the ears to readily start the wedging action of the lugs 119 against the ears 126 which causes the ears to be spread and the lugs to be latched into the retainer recesses 131 which, as shown in FIG. 4, can be in the form of pockets rather than through openings.

As shown in FIG. 5, the latching projection 219 can be in the form of a cylindrical or rounded-nose stud projecting from nut base 10 and engageable in a larger cylindrical bore 231 in the opposed flexible ear 26, with sufficient clearance to provide the desired limited movement of the nut on its seat, for alignment operation. Projection 219 can be formed integrally with base 10 by end-milling or routing off the lateral areas of a rectangular projection such as projection 19 of FIG. 1, using an annular or female type cutter.

I claim:

1. A barrel nut assembly comprising: a one piece metal cradle comprising a segmental cylindrical body receivable in a mounting bore, said cradle having a chordal nut seat and including, at opposite extremities thereof, integral spaced thin, flexible retainer ears projecting above said seat, and having a bolt hole intersecting said nut seat normal thereto; and a nut including a base having a seating face adapted to rest on said seat and having at opposite extremities thereof, holding faces engageable with said ears with a rotation preventing engagement; said ears having opposed recesses and said opposite extremities of the base having low latching projections extending radially from said holding faces and receivable in said recesses to provide coupling connections operable to hold said nut base in seating relation to said seat and providing for limited transverse shifting of said nut base between said ears for self-alignment of the nut with reference to a bolt inserted through said bolt hole; said ears being relatively thin, flexible and elastic so as to permit said nut base to be forced between them with said latching projections in opposed engagement with said ears and with the ears yielding apart to permit said projections to be moved into said recesses.

2. A barrel nut assembly as defined in claim 1, wherein said ears extend at right angles to said seat and have beveled faces along their extremities remote from said seat, said beveled faces defining a flaring mouth to freely receive said projections between said ears and operating with a wedging effect to effect said spreading of the ears in response to forcing of said nut base toward said seat.

3. A barrel nut assembly as defined in claim 1, wherein said projections are of solid wedge shaped construction, with inclined outer faces converging toward said seating face of said base and having entering ends spaced apart a distance somewhat less than the distance between the inner faces of said ears whereby to provide for free reception of said latching lugs between said ears and for the spreading of said ears by the wedging action of said lugs when forced between said ears.

4. A barrel nut assembly as defined in claim 1, wherein said projections are of greater height than radical length and are of rectangular form in side elevation and wherein said recesses are of correspondingly rectangular form but of substantially greater width than said lugs whereby to provide for limited transverse shifting of said nut base on said seat.

5. A barrel nut assembly as defined in claim 1, wherein said projections project outwardly to a depth considerably less than the thickness of said ears.

6. A barrel nut assembly as defined in claim 1, wherein said recesses are in the form of pockets with closed bottoms.

7. A barrel nut assembly as defined in claim 1, wherein said projections and recesses are cylindrical and of greater diameter than radial length, with the recesses being of larger diameter than the projections whereby to provide for limited transverse shifting of said nut base on said seat.

References Cited

UNITED STATES PATENTS

| | | | |
|---|---|---|---|
| 2,159,580 | 5/1939 | Zifferer | 85—75 |
| 2,443,752 | 6/1948 | Tinnerman | 151—41.76 |
| 2,451,991 | 10/1948 | Swanstrom | 151—41.75 |
| 2,815,789 | 12/1957 | Hutson et al. | 151—41.7 |
| 2,920,672 | 1/1960 | Bronson | 151—41.76 |
| 3,164,191 | 1/1965 | Grimm et al. | 151—41.75 |

FOREIGN PATENTS

| | | |
|---|---|---|
| 1,171,209 | 5/1964 | Germany. |
| 823,188 | 11/1959 | Great Britain. |

CARL W. TOMLIN, *Primary Examiner.*

MARION PARSONS, Jr., *Assistant Examiner.*